(12) United States Patent
Sathish et al.

(10) Patent No.: US 9,244,150 B2
(45) Date of Patent: Jan. 26, 2016

(54) METHOD AND APPARATUS FOR PROVIDING LOCATION INFORMATION OF USER DEVICES BASED ON SIGNAL FREQUENCIES OF TRANSMITTERS

(75) Inventors: Sailesh Kumar Sathish, Tampere (FI); Jussi Leppanen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 900 days.

(21) Appl. No.: 13/482,363

(22) Filed: May 29, 2012

(65) Prior Publication Data
US 2013/0321208 A1    Dec. 5, 2013

(51) Int. Cl.
| | |
|---|---|
| *G01S 3/80* | (2006.01) |
| *G01S 5/02* | (2010.01) |
| *G01S 5/18* | (2006.01) |
| G01S 5/26 | (2006.01) |
| G01S 1/14 | (2006.01) |
| G01S 1/72 | (2006.01) |

(52) U.S. Cl.
CPC ............... *G01S 5/0252* (2013.01); *G01S 5/18* (2013.01); *G01S 1/14* (2013.01); *G01S 1/72* (2013.01); *G01S 5/26* (2013.01)

(58) Field of Classification Search
CPC ............... G01S 5/18; G01S 5/26; G01S 1/72; G01S 11/14

USPC ........................................... 342/386; 367/118
See application file for complete search history.

(56) References Cited

U.S. PATENT DOCUMENTS

| | | | | |
|---|---|---|---|---|
| 6,141,293 | A * | 10/2000 | Amorai-Moriya et al. ... | 367/127 |
| 8,729,901 | B2 * | 5/2014 | Lam et al. ..................... | 324/329 |
| 8,779,895 | B2 * | 7/2014 | Holm ........................... | 340/10.1 |
| 8,861,310 | B1 * | 10/2014 | Karakotsios et al. ......... | 367/124 |
| 8,941,619 | B2 * | 1/2015 | Lee .............................. | 345/175 |

OTHER PUBLICATIONS

Chawathe, S. et al., "Low-Latency Indoor Localization Using Bluetooth Beacons", pp. 1-7.
Filonenko, V. et al., "Investigating Ultrasonic Positioning on Mobile Phones", pp. 1-10, 2010 International Conference on Indoor Positioning and Indoor Navigation (IPIN), Sep. 15-17, 2010, Zürich, Switzerland.

* cited by examiner

*Primary Examiner* — Mark Hellner
(74) *Attorney, Agent, or Firm* — Alston & Bird LLP

(57) ABSTRACT

An approach is provided for providing location information of user devices based on signal frequencies of transmitters. The positioning platform processes and/or facilitates a processing of one or more signals, from one or more transmitters, captured at one or more user devices to determine one or more frequencies of the one or more signals. Next, the positioning platform determines device location information of the one or more user devices based, at least in part, on the one or more frequencies.

16 Claims, 12 Drawing Sheets

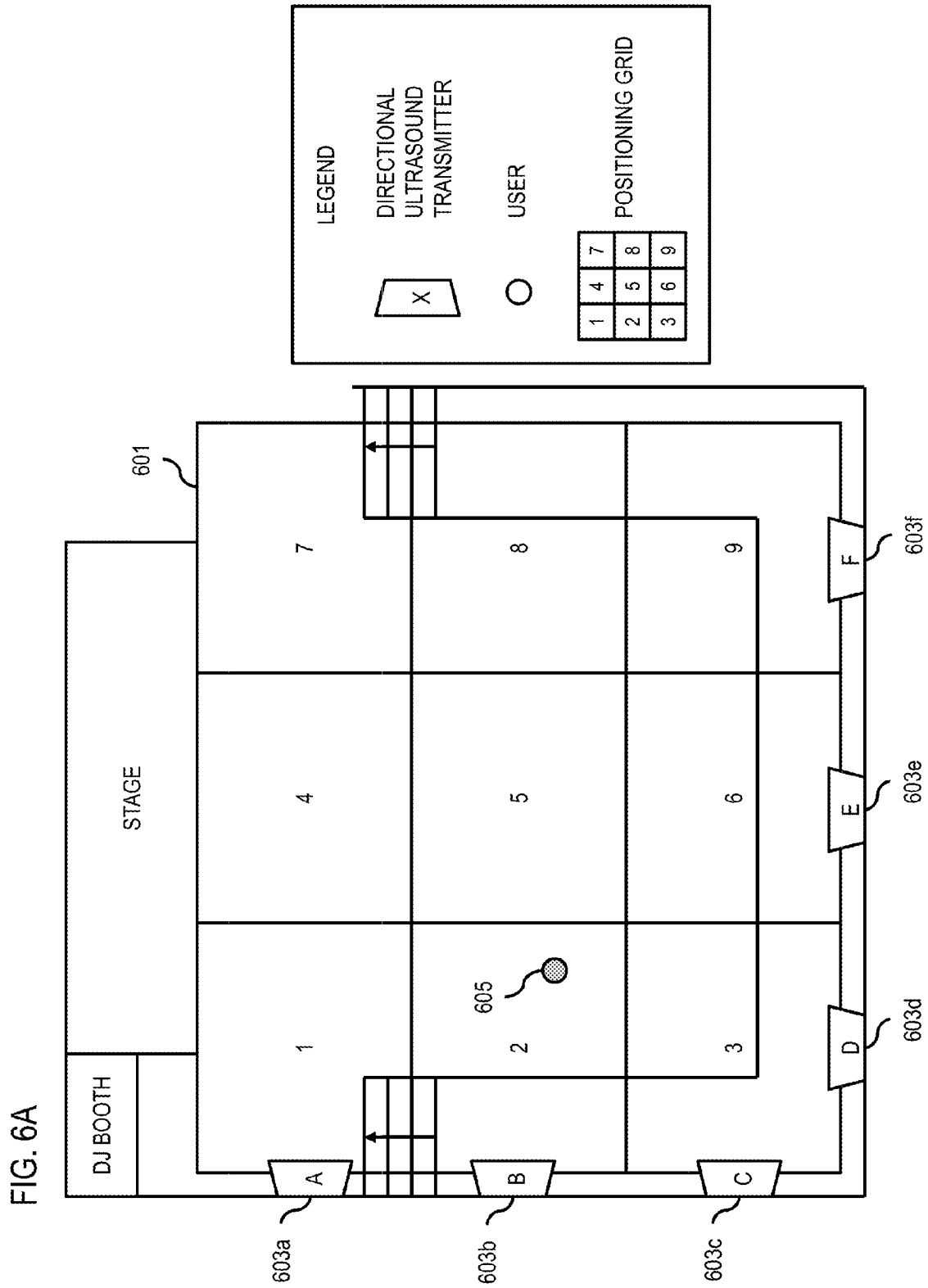

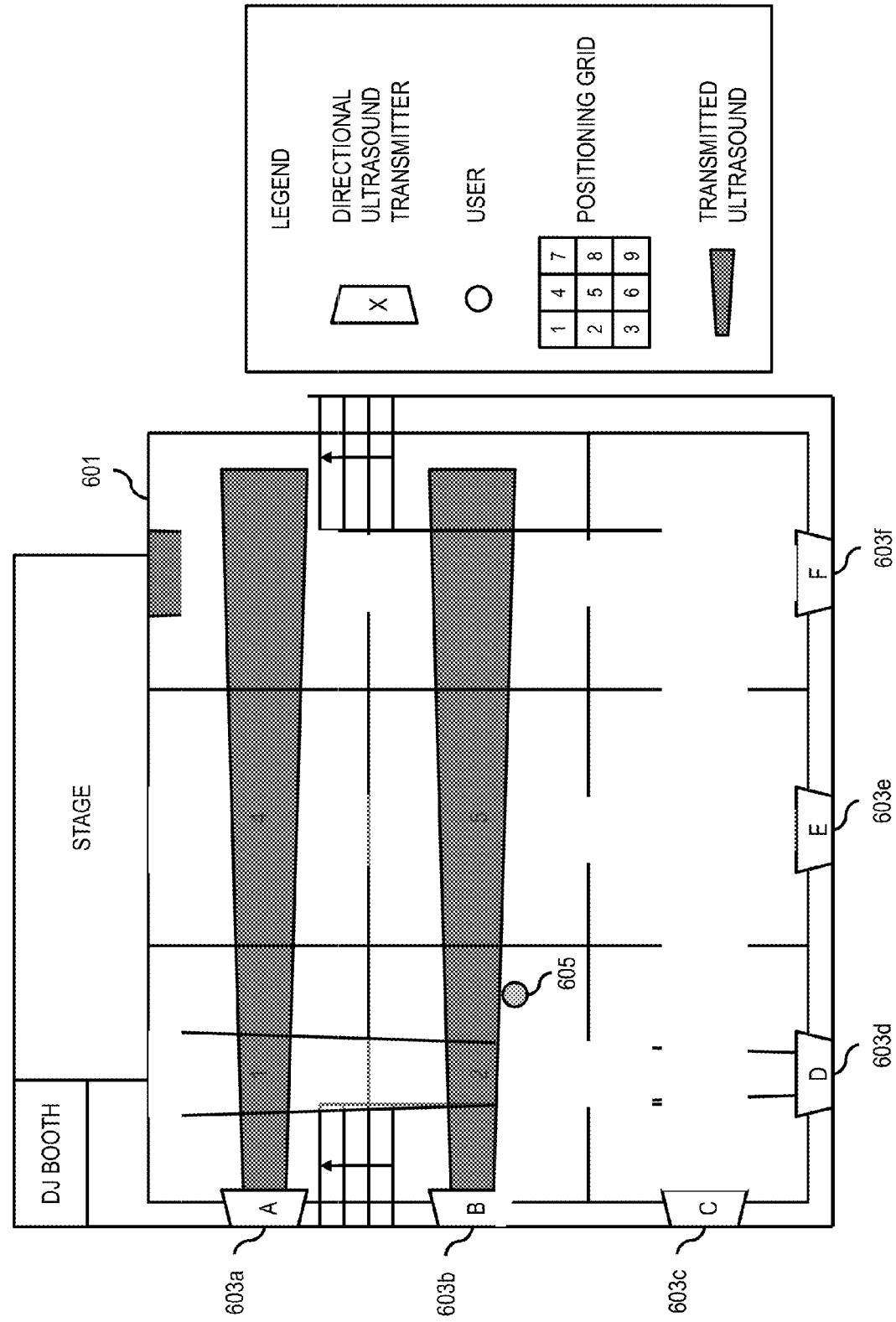

METHOD AND APPARATUS FOR PROVIDING LOCATION INFORMATION OF USER DEVICES BASED ON SIGNAL FREQUENCIES OF TRANSMITTERS

BACKGROUND

Service providers and device manufacturers (e.g., wireless, cellular, etc.) are continually challenged to deliver value and convenience to consumers by, for example, providing compelling network services. One area of interest has been the development of services that offer user location information. Typically, location information services utilize global positioning system (GPS) modules within mobile devices to provide users with their location information. However, GPS tracking is generally not available indoors. Consequently, other methods are necessary to track a user's indoor location and movements.

SOME EXAMPLE EMBODIMENTS

Therefore, there is a need for an approach for providing location information of user devices based on signal frequencies of transmitters.

According to one embodiment, a method comprises processing and/or facilitating a processing of one or more signals, from one or more transmitters, captured at one or more user devices to determine one or more frequencies of the one or more signals. The method also comprises determining device location information of the one or more user devices based, at least in part, on the one or more frequencies.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of one or more signals, from one or more transmitters, captured at one or more user devices to determine one or more frequencies of the one or more signals. The apparatus is also caused to determine device location information of the one or more user devices based, at least in part, on the one or more frequencies.

According to another embodiment, a computer-readable storage medium carries one or more sequences of one or more instructions which, when executed by one or more processors, cause, at least in part, an apparatus to process and/or facilitate a processing of one or more signals, from one or more transmitters, captured at one or more user devices to determine one or more frequencies of the one or more signals. The apparatus is also caused to determine device location information of the one or more user devices based, at least in part, on the one or more frequencies.

According to another embodiment, an apparatus comprises means for processing and/or facilitating a processing of one or more signals, from one or more transmitters, captured at one or more user devices to determine one or more frequencies of the one or more signals. The apparatus also comprises means for determining device location information of the one or more user devices based, at least in part, on the one or more frequencies. Moreover, it is noted that the apparatus may further comprise means for performing any of the functions described below (e.g., causing a generation of the one or more frequencies by the one or more transmitters, processing and/ or facilitating a processing of the one or more frequencies, etc.)

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6A-6C are diagrams of a use case using audio signals to determine location information of a user device, according to various embodiments;

DESCRIPTION OF SOME EMBODIMENTS

Examples of a method, apparatus, and computer program for providing location information of user devices based on signal frequencies of transmitters are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
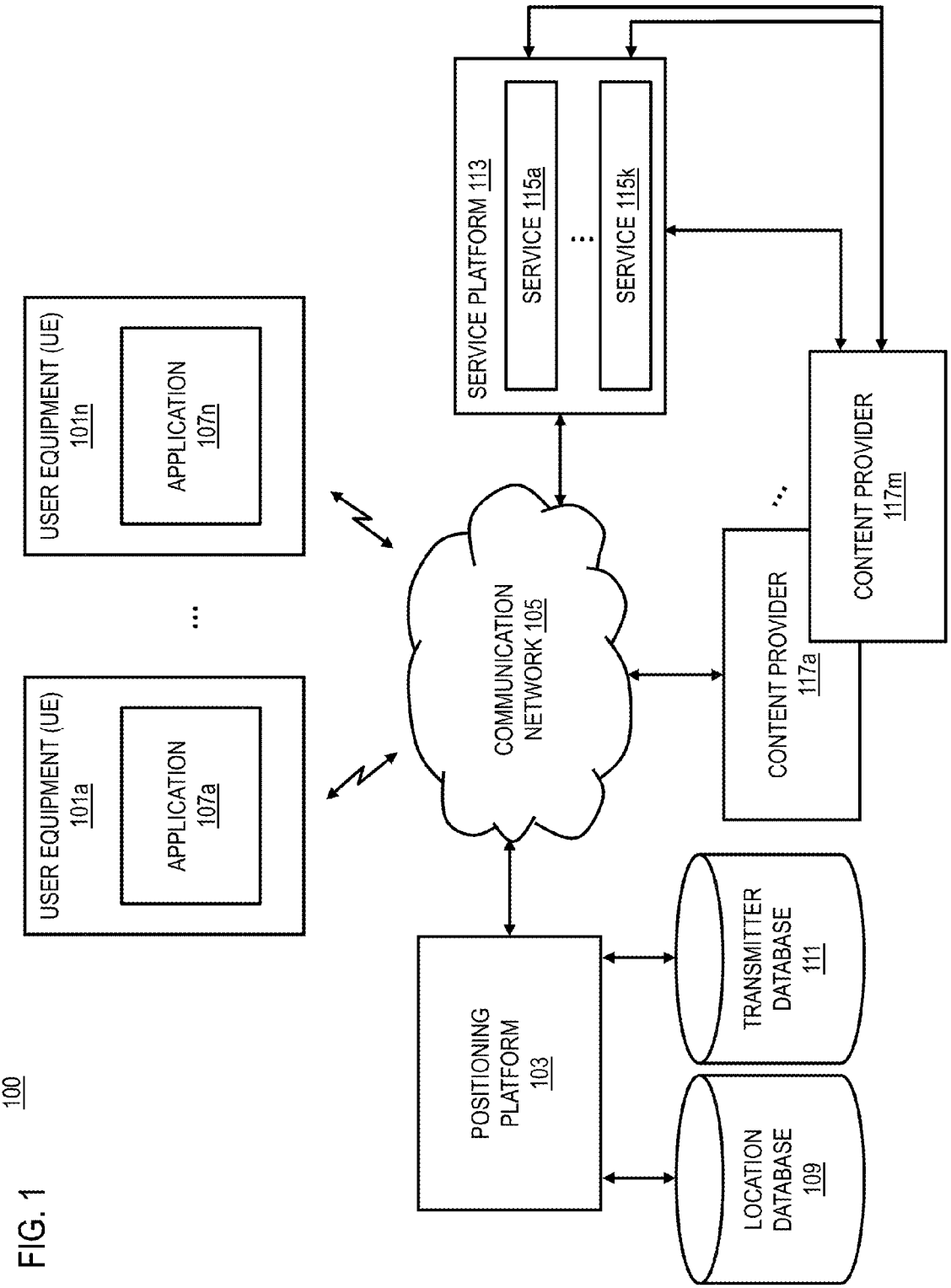
FIG. 1 is a diagram of a system capable of providing location information of user devices based on signal frequencies of transmitters, according to one embodiment.

FIG. 1 is a diagram of a system capable of providing location information of user devices based on signal frequencies of transmitters, according to one embodiment. As indicated, GPS data is typically utilized to track user location and movements. However, there are many situations in which GPS data is not available, including when the user is inside a building, within a tunnel, etc. As a result, in these scenarios, location information services cannot rely on GPS to accurately obtain data with respect to a user's position or movements.

To address this problem, a system 100 of FIG. 1 introduces the capability to provide location information of user devices based on signal frequencies of transmitters. It is noted, however, that although various embodiments are described with respect to audio signals, it is contemplated that the approach described herein may be used with other signals (e.g., wireless radio signals). Specifically, the system 100 may process transmitter signals captured at a user device to determine frequencies of those transmitter signals. The system 100 may then determine device location information (or user location information) of the user device based on the determined frequencies. In certain embodiments, the transmitters from which the signals are broadcasted may include one or more speakers, and the signals include one or more audio signals. In further embodiments, the speakers may include one or more fixed directional speakers at predetermined locations (e.g., speakers that transmit audio signals along a particular direction and that are fixed at the various predetermined locations), and the audio signals may be associated with ultrasound frequencies (e.g., 20 kHz or above). By way of example, audio frequencies in the ultraband range (e.g., 20 to 24 kHz) may be used to determine user positions. Such a range, for instance, is capable of being accurately recorded with mobile phones using a typical sampling rate (e.g., 48 kHz sampling rate) and is greater than the upper limit of human hearing. In this way, data with respect to a user's location or movements may be effectively and efficiently acquired since such an approach can provide reliable positioning data and support 3-axis (X,Y,Z) positioning, movement of users, multiple map resolutions, etc., while minimizing requirements for infrastructure support, operational costs, battery consumption, user input, and new hardware components.

As shown in FIG. 1, the system 100 comprises a user equipment (UE) 101 (or multiple UEs 101a-101n) having connectivity to the positioning platform 103 via a communication network 105. The UE 101 may include or have access to an application 107 (e.g., applications 107a-107n) to enable the UE 101 to interact with, for instance, the positioning platform 103, which may: (1) process signals, from transmitters, captured at a user device to determine frequencies of those signals; (2) determine device location information of the user device based on the frequencies; (3) determine transmitter location information of the transmitters along with associations of the signals with the transmitters; (4) cause a filtering of the signals based on associated frequencies of the transmitters to generate output signals; (5) process the output signals to determine energy levels of the output signals; (6) determine intersections of the output signals based on the energy levels; (7) cause a presentation of a map depicting the device location information based on the transmitter location information; (8) cause a combining of the transmitters and/or a modification of the associated frequencies; or (9) perform other functions.

In various embodiments, the positioning platform 103 may include or have access to a location database 109 to access or store map information associated with particular environments, user location information (e.g., based on device location information), user location history, etc. The positioning platform 103 may also include or have access to a transmitter database 111 to access or store transmitter data, including transmitter location information, associated frequencies or phases of the transmitters, frequency hopping data of the transmitters, transmitter model/type information, etc. Data stored in the location database 109 and the transmitter database 111 may, for instance, be provided by the UEs 101, a service platform 113, one or more services 115 (or services 115a-115k), one or more content providers 117 (or content providers 117a-117m), and/or other services available over the communication network 105. For example, a certain service 115 may provide various maps along with transmitter data associated with those maps to the location database 109 and the transmitter database 111. It is noted that the positioning platform 103 may be a separate entity of the system 100, a part of the one or more services 115 of the service platform 113, or included within the UE 101 (e.g., as part of the application 107). In addition, it is noted that the positioning platform 101 may be provided with configurable transmission data (e.g., via services 115, the transmitter database 111, etc.) that enable the positioning platform 103 to control the frequencies at which each transmitter can transmit.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In another embodiment, the positioning platform 103 may determine transmitter location information of the one or more transmitters. The positioning platform 103 may then determine one or more associations of the one or more signals with the one or more transmitters, wherein the device location information is further based, at least in part, on the one or more associations and the transmitter location information. As indicated, the transmitters may be located at predetermined points associated with a map (e.g., transmitter location information may be stored in the transmitter database 111). In one scenario, each transmitter be associated with a particular frequency (e.g., within the range of 20 to 24 kHz) such that each transmitter may transmit short wave audio pulses with its associated frequency. As discussed, a user device within the vicinity of the transmitted audio pulses may capture the signals from the transmitters and upload the captured signals to a positioning service hosting the positioning platform 103. The positioning platform 103 may then identify which transmitters are associated with the captured signals based on the determined frequencies, for instance, by processing the captured signals to determine the frequencies of the captured signals and matching the determined frequencies with the associated frequencies of the transmitters. The location information of the identified transmitters may thereafter be utilized to determine the location of the user device, and, thus, the location of the user of the user device.

In another scenario, the positioning platform 103 (or various components of the positioning platform 103) may be hosted at the user device (e.g., the UE 101). As such, the user device may perform the processing of the captured signals to determine the location of the user, for instance, by determining the frequencies of the captured signals and matching the determined frequencies with the associated frequencies of the transmitters. In addition, the user device may be provided with venue information (e.g., map information for the venue that the user is currently located) via signaling from a server so that the user device may determine the device location information based on the transmitter positions indicated by the venue information. The server may, for instance, send the venue information to the user device based on initial location information, such as GPS, A-GPS, cell identification (ID), etc., before the user enters a particular venue. In yet another scenario, some of the transmitters may be associated with the same frequency, the same set of frequencies, etc. However, those transmitters may be associated with various combinations of frequencies and phases. As such, the location of the user may also be determined by determining the frequencies and phases of the captured signals, and matching the determined frequencies and phases with the associated frequencies and phases of the transmitters.

In another embodiment, the positioning platform 103 may determine one or more associated frequencies of the one or more transmitters. The positioning platform 103 may then cause, at least in part, a filtering of the one or more signals based, at least in part, on the one or more associated frequencies to generate one or more output signals. By way of example, the positioning platform 103 may utilize a number of band pass filters calibrated based on the associated frequencies (e.g., the band pass filters may be centered at the various associated frequencies). Audio signals from fixed directional speakers (e.g., speakers that transmit audio signals along a particular direction and that are fixed at various predetermined locations) may, for instance, be captured by the user device, and, thereafter, processed by the band pass filters that will generate output signals indicating the transmitters corresponding to the captured signals. The location information of those transmitters may then be utilized to determine the location of the user.

In another embodiment, the positioning platform 103 may process and/or facilitate a processing of the one or more output signals to determine one or more energy levels of the one or more output signals, wherein the device location information is further based, at least in part, on the one or more energy levels. As mentioned, the output signals may be generated based on the filtering of the captured signals, and the output signals may indicate the transmitters that correspond with the captured signals. As an example, the transmitters having associated frequencies that match the output signals having the highest energy levels may be determined to be the transmitters that correspond to the captured signals. The location information of those transmitters may then be utilized to determine the location of the user.

In another embodiment, the positioning platform 103 may determine one or more intersections of the one or more output signals based, at least in part, on the one or more energy levels, wherein the device location information is further based, at least in part, on the one or more intersections. In one use case, some of the transmitters may transmit short wave audio pulses in the X direction, while other transmitters may transmit short wave audio pulses in the Y direction. As such, it may be determined that the output signal having the highest energy level of the output signals associated with the X direction (e.g., output signals corresponding to associated frequencies of transmitters that transmit in the X direction) intersects with the output signal having the highest energy level of the output signals associated with the Y direction (e.g., output signals corresponding to associated frequencies of transmitters that transmit in the Y direction). Thus, the intersecting point of the two output signals may thereafter be utilized to determine the location of the user.

In another embodiment, the positioning platform 103 may cause, at least in part, a presentation of a map depicting the device location information based, at least in part, on the transmitter location information. By way of example, the map may be a grid-based map that depicts fixed directional transmitters based on their predetermined location information. Transmitters that broadcast signals in the X direction may, for instance, be presented along one axis, while transmitters that broadcast signals in the Y direction may be presented another axis. In addition, each grid cell of the grid-based map may be associated with the intersection of at least two directional transmitters. As such, if a user device is determined to be located at a particular intersection, the grid-based map may depict the user device in the grid cell associated with that intersection. It is noted that, in some embodiments, each grid cell of the grid-based map may be associated with three or more directional transmitters, for instance, if altitude also needs to be computed (e.g., some user devices may be equipped with altimeters which may alternatively be used to determine the altitude of those user devices).

In another embodiment, the positioning platform 103 may cause, at least in part, a combining of the one or more transmitters, a modification of one or more associated frequencies of the one or more transmitters, or a combination thereof, wherein the device location information is further based, at least in part, on the combining, the modification, or a combination thereof. In one scenario, certain venues may have a large number of available speakers to increase the map resolution to enable higher precision in identifying a user's position. However, in some situations, the higher resolution may not be desirable if, for instance, the purpose is to signal the user to move to a certain position that is easy to comprehend (e.g., a map with a several large grid cells may be easier for a user to comprehend than a map with thousands of tiny grid cells). Thus, the positioning platform 103 may combine one or more speakers by viewing the frequencies associated with those speakers as being associated with a single entity, thereby, reducing the resolution.

In another scenario, certain venue may have very few speakers, resulting in user location blackouts where a user's location cannot be determined (e.g., due to low energy data from the speakers). Thus, the positioning platform 103 may increase the directionality of the speakers by varying the frequencies of the speakers to modify the coverage range. For example, by lowering the frequencies of the speakers, the coverage area and range may be increased. The positioning platform 103 may, for instance, monitor energy levels of captured signals from user devices, and determine the frequencies that should be utilized by the transmitters based on the monitoring along with service needs (e.g., resolution, coverage area, etc.).

By way of example, the UE 101, the positioning platform 103, the service platform 113, the services 115, and the content providers 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
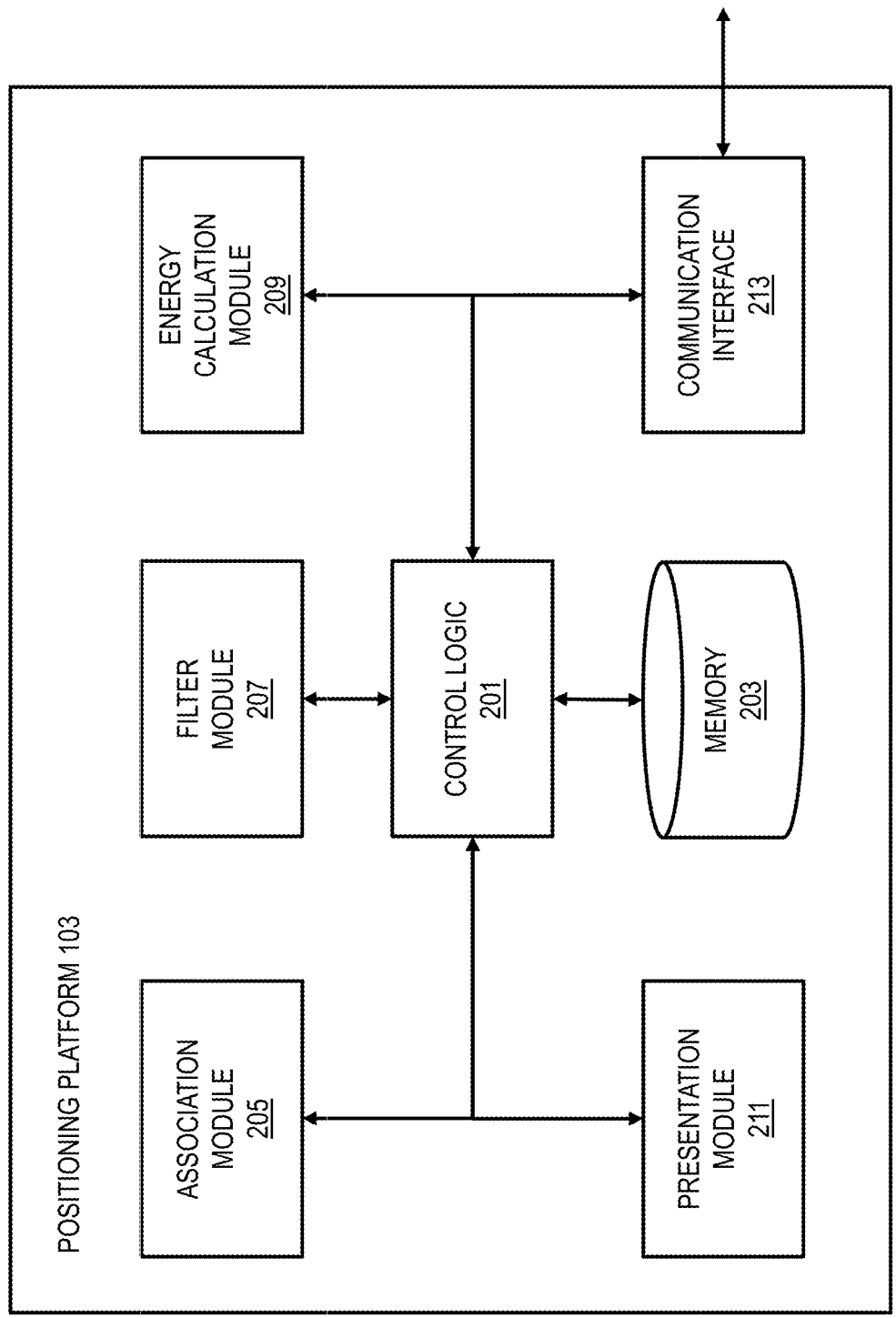
FIG. 2 is a diagram of the components of a positioning platform, according to one embodiment.

FIG. 2 is a diagram of the components of a positioning platform, according to one embodiment. By way of example, the positioning platform 103 includes one or more components for providing location information of user devices based on signal frequencies of transmitters. It is contemplated that the functions of these components may be combined in one or more components or performed by other components of equivalent functionality. In this embodiment, the positioning platform 103 includes control logic 201, memory 203, an association module 205, a filter module 207, an energy calculation module 209, a presentation module 211, and a communication interface 213.

The control logic 201 executes at least one algorithm for executing functions of the positioning platform 103. For example, the control logic 201 may interact with the association module 205 to process transmitter signals captured at a user device to determine frequencies of the captured signals. The association module 205 may, for instance, determine one or more associated frequencies of the transmitters (from which the signals are transmitted) and then work with the filter module 207 to filter the captured signals based on the associated frequencies to generate output signals. The output signals of the filter module 207 may thereafter be passed to the energy calculation module 209, which may process the output signals to determine the energy levels of the output signals.

In certain embodiments, the association module 205 may then utilize the energy levels to determine one or more intersections of the output signals. As discussed, in one scenario, the intersection associated with output signals (or the transmitters) having the highest energy levels may be determined to be the intersection at which the user (or the user device) is located. As such, the association module 205 may determine the frequencies of the captured signals corresponding to those output signals, and then determine the transmitters that are associated with those captured signal by comparing the determined frequencies of those captured signals with the known frequencies of the transmitters.

The control logic 201 may also direct the presentation module 211 to present a map depicting the device location information based on the transmitter location information. By way of example, the map may be a grid-based map that depicts fixed directional transmitters along the X and Y axes of the grid-based map based on their predetermined location information. As mentioned, each grid cell of the grid-based map may be associated with the intersection of at least two directional transmitters. As such, if a user device is determined to be located at a particular intersection, the grid-based map may depict the user device in the grid cell associated with that intersection.

The control logic 201 may additionally utilize the communication interface 213 to communicate with other components of the positioning platform 103, the UEs 101, the service platform 113, the services 115, the content providers 117, and other components of the system 100. For example, the communication interface 213 may be utilized to receive signals captured by a signal capturing module (e.g., audio microphone) at a UE 101. The communication interface 213 may further include multiple means of communication. In one use case, the communication interface 213 may be able to communicate over short message service (SMS), multimedia messaging service (MMS), internet protocol, email, instant messaging, voice sessions (e.g., via a phone network), or other types of communication.

Figure 3A:
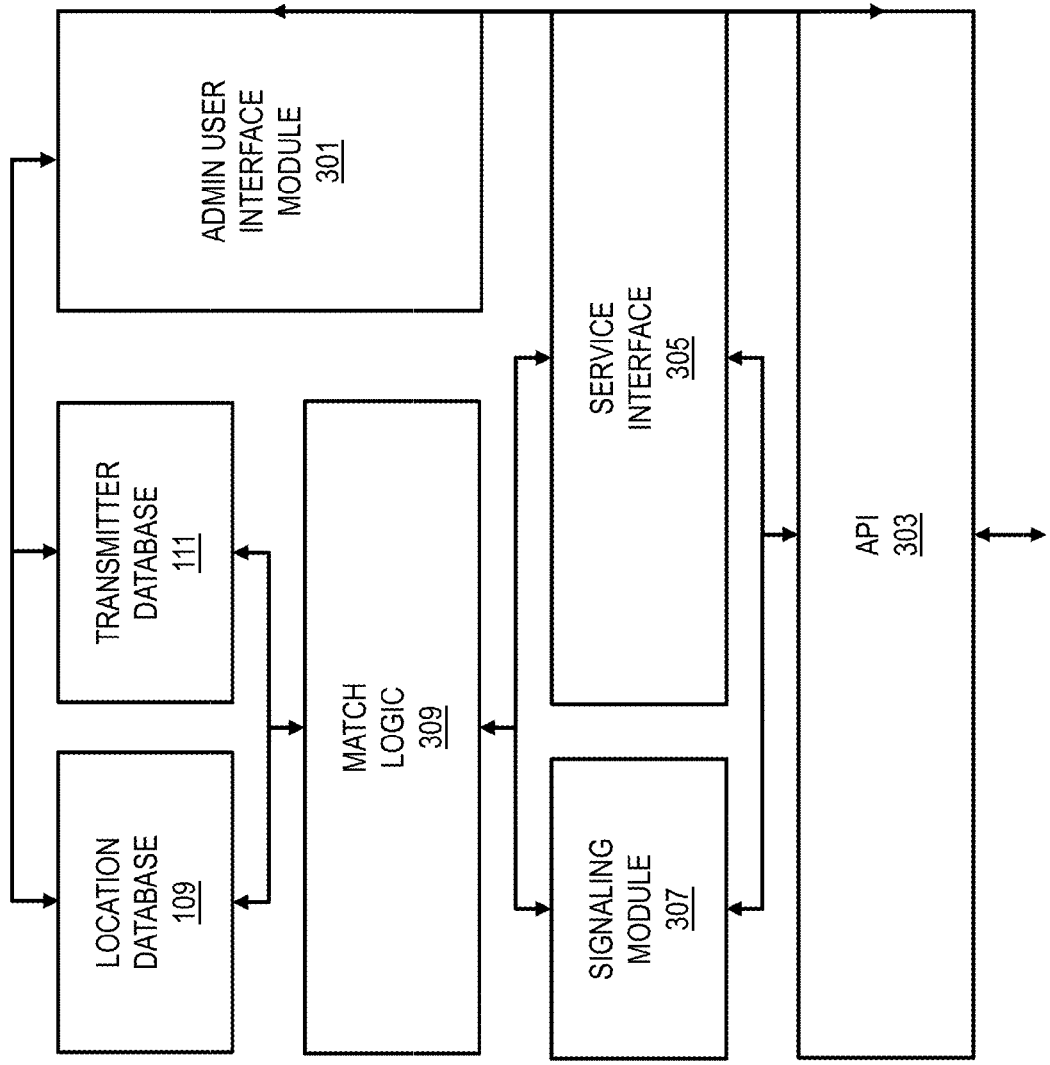
FIGS. 3A and 3B are diagrams relating to a deployment framework, according to one embodiment.
Figure 3B:
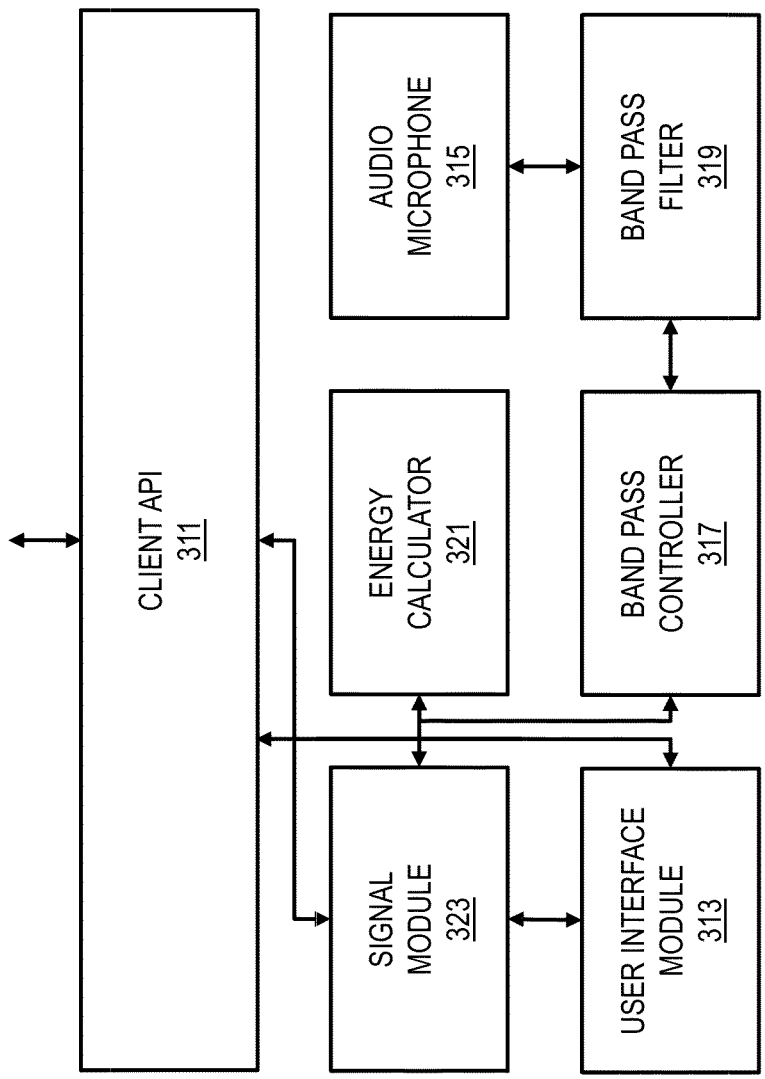

FIGS. 3A and 3B are diagrams relating to a deployment framework, according to one embodiment. As illustrated, in FIG. 3A, the server side may include location database 109 and transmitter database 111 for storing and accessing map and transmitter information (e.g., including transmission frequencies employed by the directional transmitters, location information of the directional transmitters, etc.). In some embodiments, the server administrator or infrastructure provide may, at any point, modify the map to change resolutions, the number of transmitters, and the transmission frequencies of the transmitters (e.g., by combining the transmitters, modifying the associated frequencies of the transmitters, etc.) without requiring any change on the client side. Server administrators may, for instance, interact with the server to make such modifications via an administrator user interface module 301. In addition, the server side may include an application programming interface (API) 303 to enable user devices to communicate with the service interface 305 and the signaling module 307. Furthermore, match logic 309 may be utilized to match determined frequencies of the captured signals (e.g., determined at the signaling module 307) with associated frequencies of the transmitters (e.g., stored at the transmitter database 111) to determine which transmitters broadcasted the captured signals. After those transmitters are identified, their location information may be used to determine the location of the user device that captured the signals from the transmitters.

As depicted, in FIG. 3B, the client side may include a client API 311 for communicating with the server side (e.g., via the API 303), and a user interface module 313 for interacting with the user. Additionally, in this scenario, the client side includes an audio microphone 315 for capturing sound (e.g., audio signals) transmitted by the transmitters, a band pass controller 317 and a band pass filter (or filters) 319 for filtering the captured sound, and an energy calculator 321 for determining the energy levels of the output signals from the band pass filter 319. Moreover, the client side may include a signal module 323 to work with the client API 311 to transmit data with respect to the output signals and the energy levels to the server side (e.g., to perform matching of the frequencies derived from the output signals and the energy levels with associated frequencies of the transmitters).

As indicated, in other embodiments, various components, such as the band pass controller 317, the band pass filter 319, the energy calculator 321, etc., may be hosted on the server side. In such scenarios, for instance, the user device may simply capture the signals from the transmitters and send the captured signals to the server side for processing. The server side may then determine location information of the user device (or the user) from the captured signals, and send the location information to the user device. In this way, the cost of user devices along with battery consumption associated with such operations may be reduced.

Figure 4:
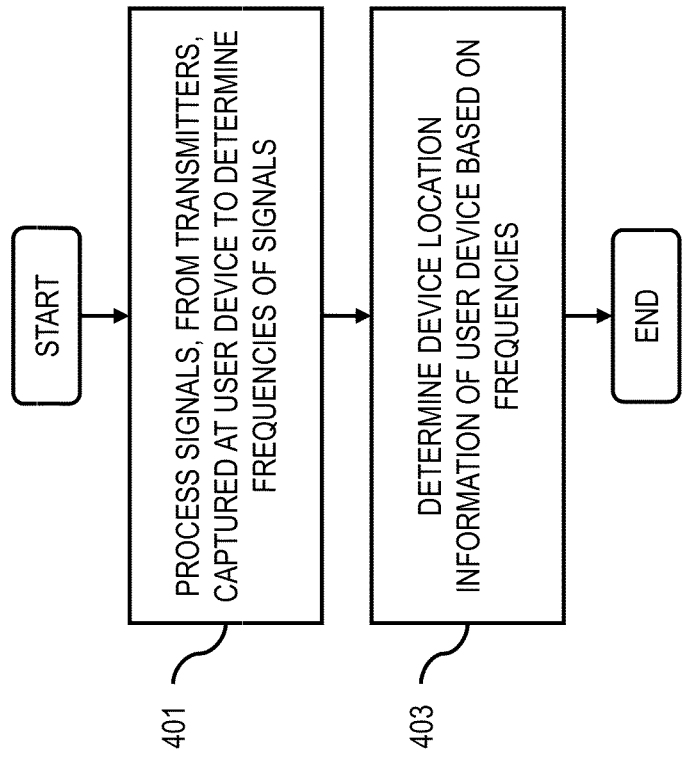
FIG. 4 is a flowchart of a process for providing location information of user devices based on signal frequencies of transmitters, according to one embodiment.
Figure 8:
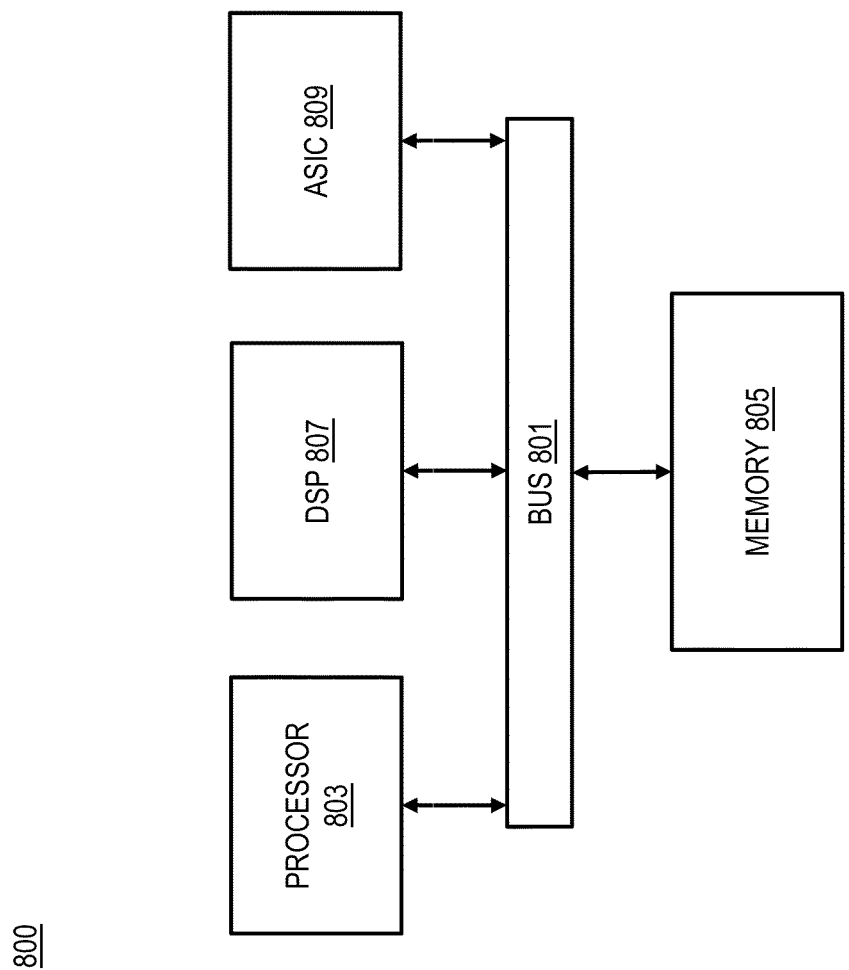
FIG. 8 is a diagram of a chip set that can be used to implement an embodiment of the invention.

FIG. 4 is a flowchart of a process for providing location information of user devices based on signal frequencies of transmitters, according to one embodiment. In one embodiment, the positioning platform 103 performs the process 400 and is implemented in, for instance, a chip set including a processor and a memory as shown in FIG. 8. As such, the control logic 201 can provide means for accomplishing various parts of the process 400 as well as means for accomplishing other processes in conjunction with other components of the positioning platform 103. In step 401, the positioning platform 103 may process and/or facilitate a processing of one or more signals, from one or more transmitters, captured at one or more user devices to determine one or more frequencies of the one or more signals.

In step 403, the positioning platform 103 may then determine device location information of the one or more user devices based on the one or more frequencies. As mentioned, in certain embodiments, the one or more transmitters may include one or more speakers, and the one or more signals may include one or more audio signals. In further embodiments, the one or more speakers may include one or more fixed directional speakers at one or more predetermined locations, and the one or more audio signals may be associated with ultrasound frequencies (e.g., 20 kHz or above). For example, audio frequencies in the ultraband range (e.g., 20 to 24 kHz) may be used to determine user positions since the range is capable of being accurately recorded with mobile phones using a typical sampling rate (e.g., 48 kHz sampling rate) and is greater than the upper limit of human hearing.

Figure 5:
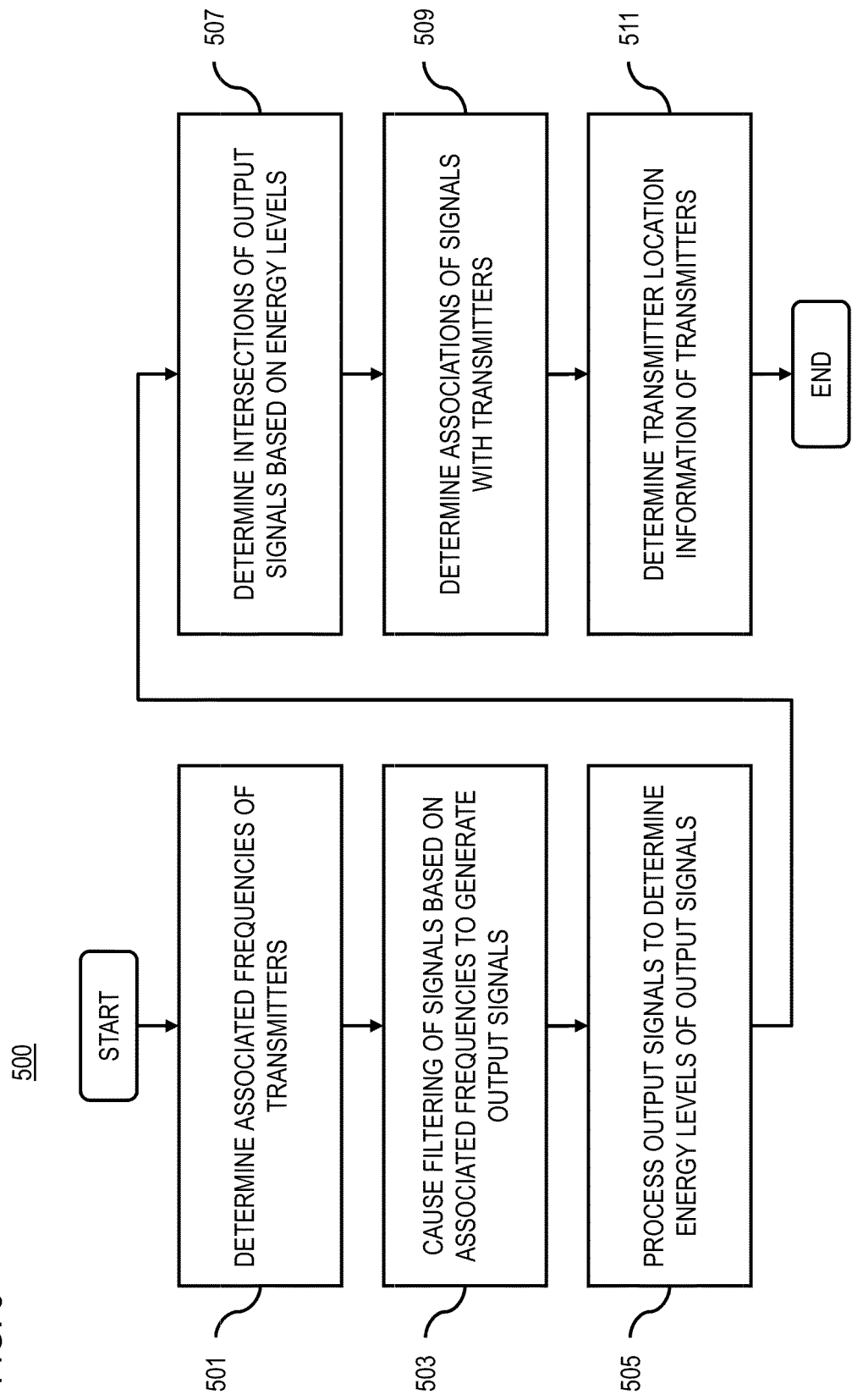
FIG. 5 is a flowchart of a process for determining location information of a user device based on associations of signals with transmitters and location information of the transmitters, according to one embodiment.

FIG. 5 is a flowchart of a process for determining location information of a user device based on associations of signals with transmitters and location information of the transmitters, according to one embodiment. In one embodiment, the positioning platform 103 performs the process 500 and is implemented in, for instance, a chip set including a processor and a memory as shown in FIG. 8. As such, the control logic 201 can provide means for accomplishing various parts of the process 500 as well as means for accomplishing other processes in conjunction with other components of the positioning platform 103.

In step 501, the positioning platform 103 may determine one or more associated frequencies of the one or more transmitters. As discussed, the one or more associated frequencies (e.g., the transmission frequencies) of the one or more transmitters as well as the location information of the one or more transmitters may be known on the server side and stored at the transmitter database 111. In other embodiments, the one or more associated frequencies and the transmitter location information may be known or accessible by the user device.

In step 503, the positioning platform 103 may cause a filtering of the one or more signals based on the one or more associated frequencies to generate one or more output signals. By way of example, various pass filters may be centered at the associated frequencies. As such, the resulting output signal of a particular band pass filter may be based on the associated frequency used to center that band pass filter.

In step 505, the positioning platform 103 may process and/or facilitate a processing of the one or more output signals to determine one or more energy levels of the one or more output signals. Then, in step 507, the positioning platform 103 may determine one or more intersections of the one or more output signals based on the one or more energy levels. In one use case, for instance, it may be determined that the output signal having the highest energy level of the output signals associated with one direction intersects with the output signal having the highest energy level of the output signals associated with another direction. The intersecting point of the two output signals may thereafter be utilized to determine the device location information.

In step 509, the positioning platform 103 may determine one or more associations of the one or more signals with the one or more transmitters. For example, the frequencies of the one or more signals may be determined by filtering the one or more signals. The determined frequencies are then compared with associated frequencies of the transmitters to determine the transmitters from which the captured signals were transmitted. In some embodiments, the determined frequencies with the highest energy levels may be compared with the associated frequencies to determine which of the transmitters' broadcast areas the user device is located. In step 511, the positioning platform 103 may also determine transmitter location information of the one or more transmitters (e.g., by accessing the transmitter database 111), which may be utilized along with the one or more associations to determine the device location information.

Figure 6C:
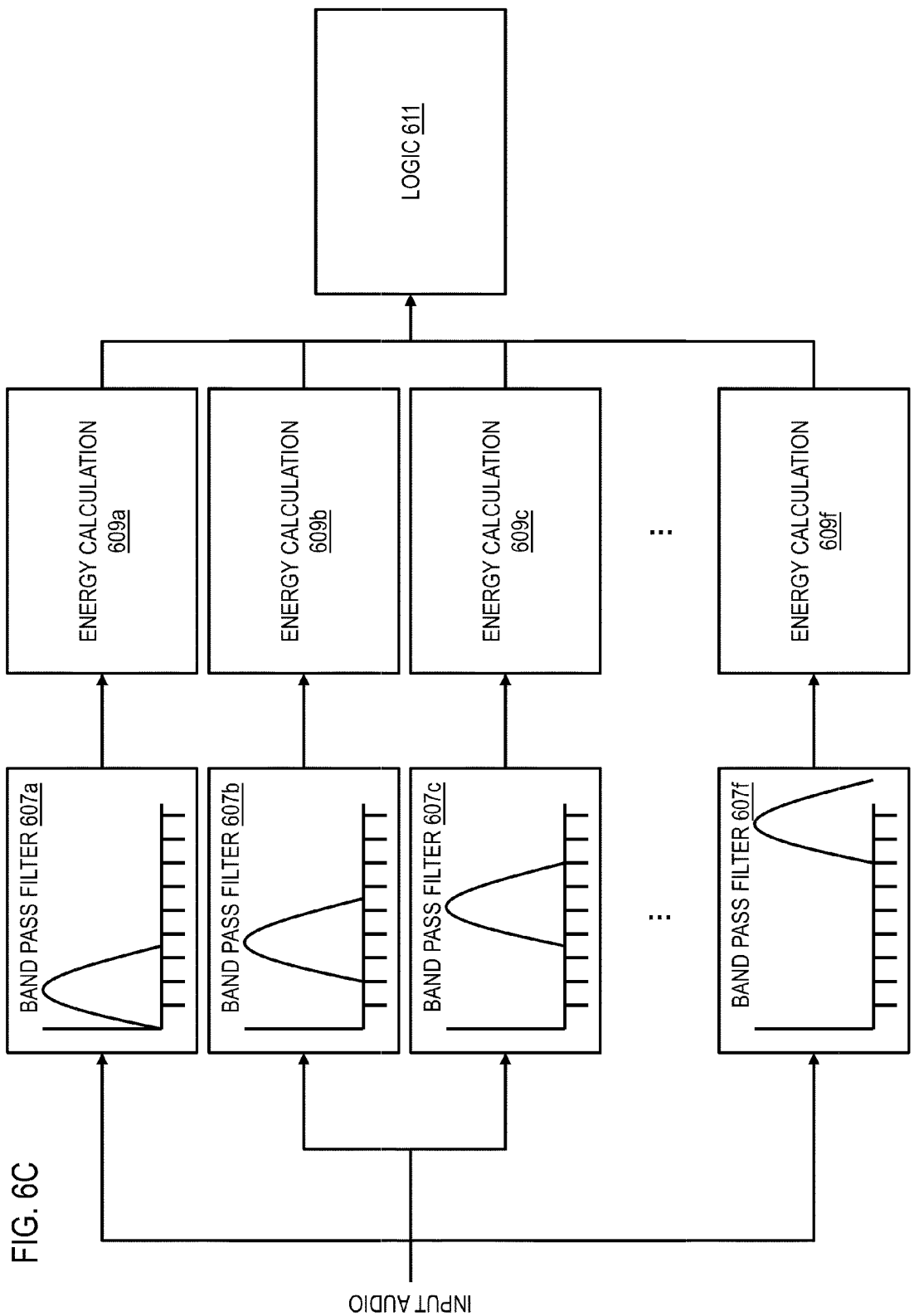

FIGS. 6A-6C are diagrams of a use case using audio signals to determine location information of a user device, according to various embodiments. For example, FIG. 6A illustrates a floor plan of a rock club with a 3×3 grid-based map 601 (e.g., with grid cells 1-9). In this scenario, the positions of the transmitters 603 (e.g., speakers) are fixed and known. Each transmitter 603 may, for instance, broadcast short wave audio pulses in ultrasound frequency (e.g., 20 kHz or above). In addition, each transmitter 603 may be associated with a single transmission frequency to reduce the cost associated with each transmitter 603. Such associations may be known at the server end (or at the user device) to enable efficient calculations with respect to user location information.

In some embodiments, each transmitter 603 transmits in such a way that no two transmitters transmit at the same frequency. A mobile phone of a user may, for instance, record audio in the ultrasound range (e.g., via the microphone of the mobile device). The mobile phone may then utilize a set of band pass filters (e.g., as many as there are ultrasound speakers in the system) which are centered at the transmitted ultrasound frequencies. The energy levels of the signals outputted from the band pass filters are then calculated. The frequencies associated with the user's position (e.g., indicator 605) may, for instance, be determined to be the highest energy levels. Thus, since the location of the speakers are known and the speakers are highly directional, the grid cell in which the user is located may easily be deduced from the energy levels associated with the output signals and the frequencies.

It is noted that, in certain embodiments, some of the transmitters 603 may transmit at the same frequency with varying phases. As such, the location of the user may be determined by determining the frequencies and phases of the recorded audio, and matching the determined frequencies and phases with the associated frequencies and phases of the transmitters 603. In further embodiments, various other approaches (e.g., frequency hopping) may also be used to determine the location of the user.

As shown, in FIG. 6B, the transmitters 603a-603c may be transmitting audio signals in the X direction, while the transmitters 603d-603f may be transmitting audio signals in the Y direction. The transmitters 603a-603f may, for instance, be transmitting sound at 20.0 kHz, 20.5 kHz, 21.0 kHz, 21.5 kHz, 22.0 kHz, and 22.5 kHz, respectively. The user's mobile device may record the audio. As indicated, the recorded audio may be processed at the mobile device or uploaded to a positioning service that will process the recorded audio to determine the user's location. As depicted, in FIG. 6C, the captured audio may be filtered through band pass filters 607a-607f that are configured for the associated frequencies of the transmitters 603a-603f (e.g., 20.0 kHz, 20.5 kHz, 21.0 kHz, 21.5 kHz, 22.0 kHz, and 22.5 kHz, respectively). Thereafter, energy calculation modules 609a-609f may process the output signals of the band pass filters 607a-607f, and forward the output data to logic 611 to determine the user's location. In this scenario, logic 611 may determine that the output signals associated with 20.5 kHz and 21.5 kHz have the highest energy levels, indicating that the user is located at the sound intersection of transmitters 603b and 603d. Thus, logic 611 will determine that the user is located in grid cell 2 of the grid-based map 601. The grid-based map 601 depicting the transmitters 603a-603f and the indicator 605 may thereafter be presented to the user, for instance, to illustrate the user's current position and/or to direct the user to his/her next location (e.g., one of the various grid cells 1-9 of the grid-based map 601).

The processes described herein for providing location information of user devices based on signal frequencies of transmitters may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
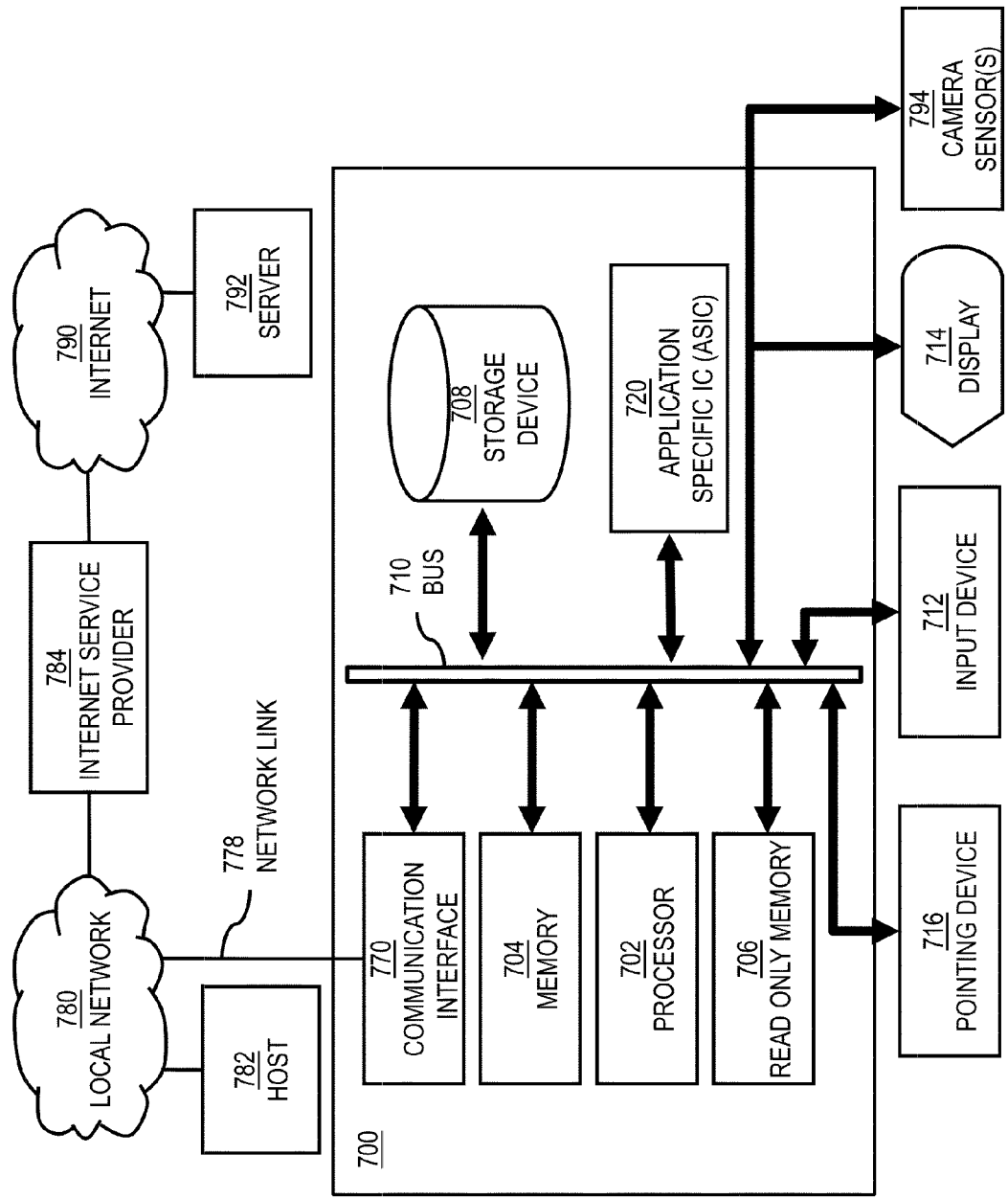
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide location information of user devices based on signal frequencies of transmitters as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing location information of user devices based on signal frequencies of transmitters.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to providing location information of user devices based on signal frequencies of transmitters. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 700 also includes a memory 704 coupled to bus 710. The memory 704, such as a random access memory (RAM) or any other dynamic storage device, stores information including processor instructions for providing location information of user devices based on signal frequencies of transmitters. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing location information of user devices based on signal frequencies of transmitters, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714, and one or more camera sensors 794 for capturing, recording and causing to store one or more still and/or moving images (e.g., videos, movies, etc.) which also may comprise audio recordings. In some embodiments, for example, in embodiments in which the computer system 700 performs all functions automatically without human input, one or more of external input device 712, display device 714 and pointing device 716 may be omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing location information of user devices based on signal frequencies of transmitters to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to provide location information of user devices based on signal frequencies of transmitters as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of providing location information of user devices based on signal frequencies of transmitters.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide location information of user devices based on signal frequencies of transmitters. The memory 805 also stores the data associated with or generated by the execution of the inventive steps.

Figure 9:
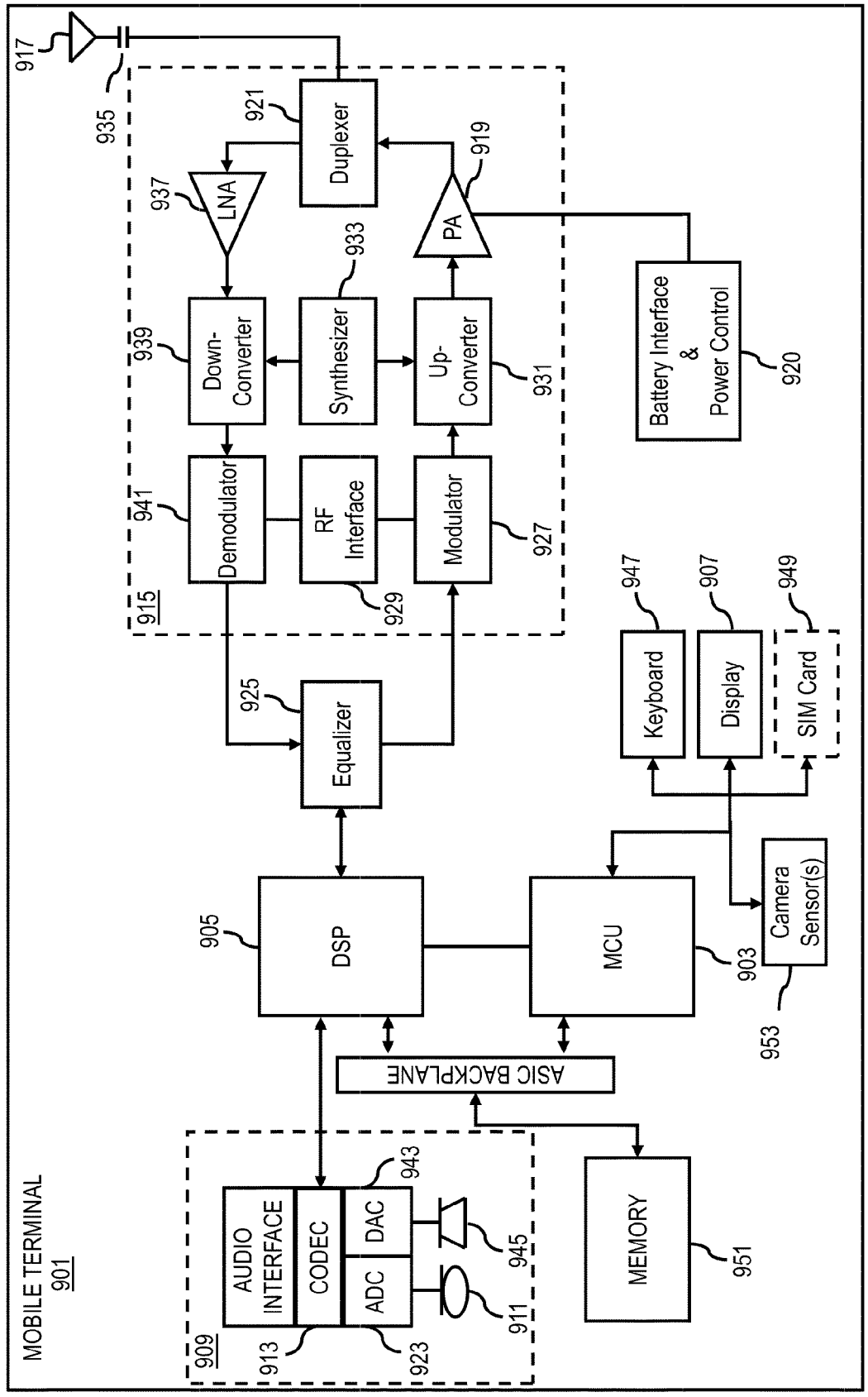
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of providing location information of user devices based on signal frequencies of transmitters. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor (s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing location information of user devices based on signal frequencies of transmitters. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide location information of user devices based on signal frequencies of transmitters. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

Further, one or more camera sensors 953 may be incorporated onto the mobile station 901 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    processing with a processor, one or more signals from one or more transmitters, the one or more signals captured at one or more user devices to determine one or more frequencies of the one or more signals;
    determining transmitter location information of the one or more transmitters from a database;
    determining respective associations of the one or more signals and the one or more frequencies with the respective one or more transmitters;
    filtering the one or more signals based on the one or more associated frequencies to generate one or more output signals; and
    determining device location information of the one or more user devices based, on the one or more frequencies, the transmitter location information, the respective associations of the one or more signals with the respective one or more transmitters, and the one or more output signals.

2. The method of claim 1, further comprising:
    processing the one or more output signals to determine one or more energy levels of the one or more output signals, wherein the device location information is further based on the one or more energy levels.

3. The method of claim 2, further comprising:
    determining one or more intersections of the one or more output signals based, on the one or more energy levels, wherein the device location information is further based on the one or more intersections.

4. The method of claim 1, further comprising:
    causing a presentation of a map depicting the device location information based on the transmitter location information.

5. The method of claim 1, further comprising:
    performing at least one of combining the one or more transmitters or modify the one or more associated frequencies of the one or more transmitters, wherein the device location information is further based on the combining, the modification, or a combination thereof.

6. The method of claim 1, wherein the one or more transmitters include, at least in part, one or more speakers, and the one or more signals include, at least in part, one or more audio signals.

7. The method of claim 6, wherein the one or more speakers include, at least in part, one or more fixed directional speakers at one or more predetermined locations.

8. The method of claim 6, wherein the one or more audio signals are associated with ultrasound frequencies.

9. An apparatus comprising:
    at least one processor; and
    at least one memory including computer program code for one or more programs,
    the at least one memory and the computer program code configured to, with the at least
    one processor, cause the apparatus to perform at least the following, process one or more signals from one or more transmitters, the one or more signals captured at one or more user devices to determine one or more frequencies of the one or more signals;
    determine transmitter location information of the one or more transmitters from a database;
    determine respective associations of the one or more signals and the one or more frequencies with the respective one or more transmitters;
    filter the one or more signals based on the one or more associated frequencies to generate one or more output signals; and
    determine device location information of the one or more user devices based, at least in part, on the one or more frequencies, the transmitter location information, the respective associations of the one or more signals with the respective one or more transmitters, and the one or more output signals.

10. The apparatus of claim 9, wherein the apparatus is further caused to:

process the one or more output signals to determine one or more energy levels of the one or more output signals, wherein the device location information is further based on the one or more energy levels.

11. The apparatus of claim 10, wherein the apparatus is further caused to:
determine one or more intersections of the one or more output signals based on the one or more energy levels, wherein the device location information is further based on the one or more intersections.

12. The apparatus of claim 9, wherein the apparatus is further caused to:
cause a presentation of a map depicting the device location information based on the transmitter location information.

13. The apparatus of claim 9, wherein the apparatus is further caused to:
cause at least one of combining of the one or more transmitters, modifying of the one or more associated frequencies of the one or more transmitters, or a combination thereof, wherein the device location information is further based on the combining, the modification, or a combination thereof.

14. The apparatus of claim 9, wherein the one or more transmitters include one or more speakers, and the one or more signals include, at least in part, one or more audio signals.

15. The apparatus of claim 14, wherein the one or more speakers include one or more fixed directional speakers at one or more predetermined locations.

16. The apparatus of claim 14, wherein the one or more audio signals are associated with ultrasound frequencies.

\* \* \* \* \*